(12) United States Patent
Gomes et al.

(10) Patent No.: US 10,933,816 B2
(45) Date of Patent: Mar. 2, 2021

(54) VEHICLE ARTICLE CARRIER SYSTEM INCORPORATING ELECTRONIC COMPONENTS

(71) Applicant: JAC Products, Inc., Saline, MI (US)

(72) Inventors: Gerald J. Gomes, Macomb, MI (US); Brendan J. Hathaway, Washington, MI (US); Murray D. Brockway, Dewitt, MI (US)

(73) Assignee: JAC Products, Inc., Saline, MI (US)

( * ) Notice: Subject to any disclaimer, the term of this patent is extended or adjusted under 35 U.S.C. 154(b) by 146 days.

(21) Appl. No.: 16/175,462

(22) Filed: Oct. 30, 2018

(65) Prior Publication Data
US 2019/0176717 A1    Jun. 13, 2019

Related U.S. Application Data

(60) Provisional application No. 62/596,965, filed on Dec. 11, 2017.

(51) Int. Cl.
| | |
|---|---|
| *B60R 11/04* | (2006.01) |
| *B62D 25/06* | (2006.01) |
| *B60R 9/042* | (2006.01) |
| *B60R 9/04* | (2006.01) |
| *B60R 11/00* | (2006.01) |

(52) U.S. Cl.
CPC ........... *B60R 11/04* (2013.01); *B60R 9/04* (2013.01); *B60R 9/042* (2013.01); *B62D 25/06* (2013.01); *B60R 2011/004* (2013.01)

(58) Field of Classification Search
CPC .......... B60R 11/04; B60R 9/04; B60R 9/042; B60R 2011/004; B62D 25/06

USPC ..................................... 296/210, 215, 37.7
See application file for complete search history.

(56) References Cited

U.S. PATENT DOCUMENTS

| | | | | |
|---|---|---|---|---|
| 4,269,339 A | * | 5/1981 | Bott ......................... | B60R 9/04 224/309 |
| 4,426,028 A | * | 1/1984 | Bott ......................... | B60R 9/04 224/325 |
| 4,800,470 A | | 1/1989 | Hartsaw | |
| 5,347,434 A | | 9/1994 | Drake | |
| 5,422,794 A | | 6/1995 | Drake | |

(Continued)

*Primary Examiner* — Jason S Morrow
*Assistant Examiner* — E Turner Hicks
(74) *Attorney, Agent, or Firm* — Harness, Dickey & Pierce, P.L.C.

(57) ABSTRACT

The present disclosure relates to a stretch/bent roof rail apparatus for use on an exterior body surface of a vehicle. The apparatus may have a roof rail having a body portion, with the body portion having an opening. A housing assembly is adapted to fit at least partially within the opening in the body portion and has a support cradle and a cap. The support cradle and the cap may be configured to be secured to one another. The housing assembly may further being configured to enable an electrically powered component to be arranged within the cap and provided with an unobstructed line of sight outwardly from the roof rail body portion. The support cradle may have a footprint generally in accordance with the roof rail and configured to fit substantially completely within the roof rail. This helps to support the electrically powered component such that the roof rail, the housing assembly, and the electrically powered component form a unitary assembly when assembled together.

21 Claims, 5 Drawing Sheets

(56) References Cited

U.S. PATENT DOCUMENTS

| | | | |
|---|---|---|---|
| 6,114,954 A * | 9/2000 | Palett | B60R 9/00 |
| | | | 224/321 |
| 6,550,414 B1 | 4/2003 | Correll et al. | |
| 6,682,132 B1 | 1/2004 | Hahn | |
| 6,702,370 B2 | 3/2004 | Shugar et al. | |
| 6,827,532 B1 | 12/2004 | Nix | |
| 7,081,810 B2 * | 7/2006 | Henderson | H01Q 1/3275 |
| | | | 340/435 |
| 7,377,674 B2 | 5/2008 | Klinkman et al. | |
| 8,414,168 B2 | 4/2013 | Jutila et al. | |
| 9,527,435 B2 | 12/2016 | Michie et al. | |
| 9,937,868 B2 * | 4/2018 | McClintock | B60Q 1/2661 |
| 10,118,538 B2 * | 11/2018 | Salter | B60Q 1/2611 |
| 2005/0212249 A1 | 9/2005 | Lopez | |
| 2007/0205240 A1 | 9/2007 | Castro et al. | |
| 2007/0217212 A1 | 9/2007 | Klinkman et al. | |
| 2008/0128187 A1 | 6/2008 | Hu | |
| 2011/0084102 A1 | 4/2011 | Sautter et al. | |
| 2011/0174855 A1 | 7/2011 | Carothers et al. | |
| 2011/0240695 A1 | 10/2011 | Aftanas | |
| 2012/0031939 A1 | 2/2012 | Jutila et al. | |
| 2013/0106135 A1 | 5/2013 | Praskovsky et al. | |
| 2014/0313343 A1 | 10/2014 | Frank et al. | |
| 2015/0180178 A1 | 6/2015 | Ranka et al. | |

\* cited by examiner

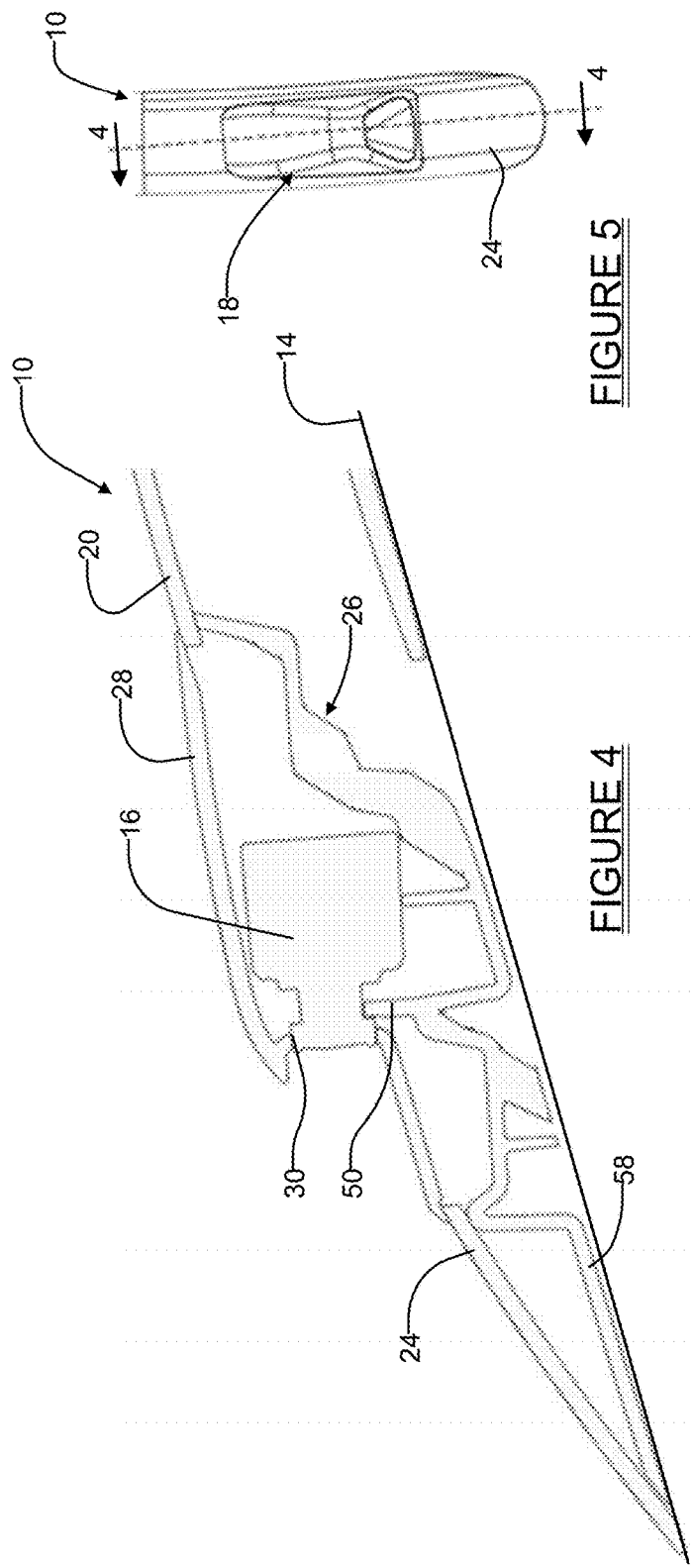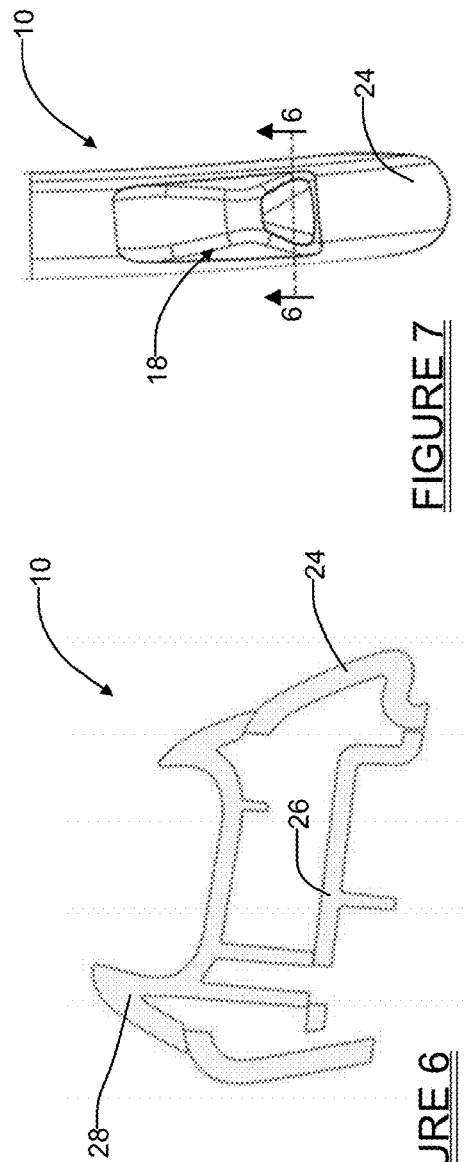
FIGURE 4
FIGURE 5
FIGURE 6
FIGURE 7

VEHICLE ARTICLE CARRIER SYSTEM INCORPORATING ELECTRONIC COMPONENTS

CROSS-REFERENCE TO RELATED APPLICATIONS

This application claims the benefit of U.S. Provisional Application No. 62/596,965, filed on Dec. 11, 2017. The entire disclosure of the above application is incorporated herein by reference.

FIELD

The present disclosure relates to vehicle article carrier systems, and more particularly to a roof mounted vehicle article car system which incorporates at least one roof rail having one or more electronic components integrated into it for augmenting a functionality of a vehicle.

BACKGROUND

The statements in this section merely provide background information related to the present disclosure and may not constitute prior art.

At the present time there is a growing interest in using roof mounted vehicle article carrier systems to accommodate various types of electronic components that can be used to augment or enhance operation of the vehicle, to even further improve the safety of the occupants riding in the vehicle, and/or to help carry out autonomous operation of a vehicle, and/or for infotainment. In particular, accessory vision (i.e., cameras), LiDAR, radar, and lighting systems used on exterior surfaces of vehicles have become common.

However, limitations have existed in unobtrusively mounting various types of electronic components on the exterior vehicle areas of motor vehicles such as car, trucks, vans and SUVs. Ideally, such electronic systems would be mounted on an exterior surface of the vehicle without being highly conspicuous, and without detracting from the vehicle's styling and/or aerodynamics. The roof of a vehicle provides a particularly desirable location for mounting sensors, antennas, cameras, LiDAR units, radar transceivers, light projecting components, etc. However, simply mounting such electronic devices on an exterior surface of the vehicle can significantly detract from the aesthetics and aerodynamics of the vehicle design. And mounting such electronic devices on conventional roof racks can also produce aesthetically unpleasing appearances, and/or reduce the aerodynamic qualities of the vehicle, and/or interfere with operation of the roof rack, and or result in annoying wind noise. Still further, there is the possibility that items mounted on the roof rack can interfere with proper operation of the electronic component. This is particularly so with cameras, lighting components, LiDAR or radar units, which require an unobstructed line of sight for their use. Accordingly, simply mounting an electronic component to the exterior of a vehicle roof or on an existing roof rack carries with it significant limitations. Nevertheless, because the elevated position of a roof rack atop a vehicle roof presents a generally unobstructed vantage point, it is still considered to be an especially ideal location for mounting an electronic component to send and/or receive optical or wireless signals, or from which to project lighting.

Present day motor vehicles are often equipped with low profile, aluminum, extruded "stretch/bent" roof rails, which are essentially extruded aluminum rails with bends at the front and rear that appear to "dive" or merge into the vehicle roof. These stretch/bent roof rails are used as styling features on a vehicle, as well as clamping locations for roof mounted accessories, for example cross bars, which can be used for carrying cargo thereon. The low profile configuration of stretch/bent roof rails makes them especially aesthetically stylistic and pleasing, as well as being highly aerodynamically efficient. However, their very low profile presents particular challenges in integrating electronic and lighting components. The low profile configuration of stretch/bent rails makes it especially difficult to integrate electronic and/or lighting components into them without producing unsightly protrusions that can also potentially result in wind noise and reduced aerodynamic efficiency. The hollow construction of stretch/bent rails would also provide an excellent way to conceal the associated wiring required by electronic and lighting systems which need to be connected to the vehicle's wiring harness for receiving power and other electrical control signals, assuming that a satisfactory integration of the electronic and/or lighting component into the stretch/bent rail could be achieved.

SUMMARY

This section provides a general summary of the disclosure, and is not a comprehensive disclosure of its full scope or all of its features.

In one aspect the present disclosure relates to a stretch/bent roof rail apparatus for use on an exterior body surface of a vehicle. The apparatus may comprise a roof rail having a body portion, with the body portion having an opening. The apparatus may further include a housing assembly adapted to fit at least partially within the opening in the body portion and including a support cradle and a cap. The support cradle and the cap may be configured to be secured to one another. The apparatus may further include an electrically powered component, with the housing assembly further being configured to enable the electrically powered component to be arranged within the cap and provided with an unobstructed line of sight outwardly from the roof rail body portion. The support cradle may have a footprint generally in accordance with the roof rail and configured to fit substantially completely within the roof rail. This helps to support the electrically powered component such that the roof rail, the housing assembly, and the electrically powered component form a unitary assembly when assembled together.

In another aspect the present disclosure relates to a stretch/bent roof rail apparatus for use on an exterior body surface of a vehicle. The apparatus may comprise a roof rail having a body portion, with the body portion having an opening. The apparatus may further include a housing assembly adapted to fit at least partially within the opening in the body portion. The housing assembly may include a support cradle and a cap, with the support cradle and the cap configured to be secured to one another. A controllable electrical component may be included. The housing assembly may further be configured to enable the controllable electrical component to be arranged within the cap and provided with an unobstructed line of sight outwardly from the roof rail body portion. At least one of the cap and the support cradle may include an alignment feature for aligning the cap within the opening in the body portion. The apparatus may also include fasteners for securing the cap to the support cradle. The support cradle may have a footprint generally in accordance with the roof rail and configured to fit substantially completely within the roof rail to help support the controllable electrical component. In this manner the roof rail, the housing assembly and the controllable electrical component form a unitary assembly when assembled together, while still enabling the roof rail to be secured to the outer body surface.

In still another aspect the present disclosure relates to a stretch/bent roof rail apparatus for use on an exterior body surface of a vehicle. The apparatus may comprise a roof rail having a body portion, with the body portion having an opening. A housing assembly may be included which is adapted to fit at least partially within the opening in the body portion. The housing assembly may include a support cradle and a cap, the support cradle and the cap are configured to be secured to one another. The apparatus may further include a camera. The housing assembly may further be configured to enable the camera to be arranged within the cap, with the cap including an additional opening to enable an unobstructed line of sight for the camera looking outwardly along a longitudinal axis of the roof rail. At least one of the cap and the support cradle including an alignment feature for aligning the cap within the opening in the body portion. A support feature may be formed on the support cradle for supporting the camera such that the camera has a field of view extending through the opening in the cap and is aligned relative to the roof rail. Fasteners may be included for securing the cap to the support cradle. The support cradle may have a footprint generally in accordance with the roof rail and configured to fit substantially completely within the roof rail, to help support the controllable electrical component. This enables the roof rail, the housing assembly and the controllable electrical component form a unitary assembly when assembled together, while still enabling the roof rail to be secured to the outer body surface.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Corresponding reference numerals indicate corresponding parts throughout the several views of the drawings.

FIG. 4 is a side cross sectional view of the housing assembly taken in accordance with section line 4-4 in FIG. 5, with the housing assembly integrated into the leading edge of the roof rail, and with the electronic component housed within the housing assembly;

FIG. 5 is a plan view of a portion of the roof rail showing the housing assembly from a plan orientation to illustrate where the section of FIG. 4 has been taken from;

FIG. 6 is a cross sectional view of the housing assembly taken in accordance with section line 6-6 in FIG. 7;

FIG. 7 is a plan view of a portion of the roof rail taken from a plan orientation to illustrate where the section of FIG. 6 has been taken from.

DETAILED DESCRIPTION

Figure 1A:
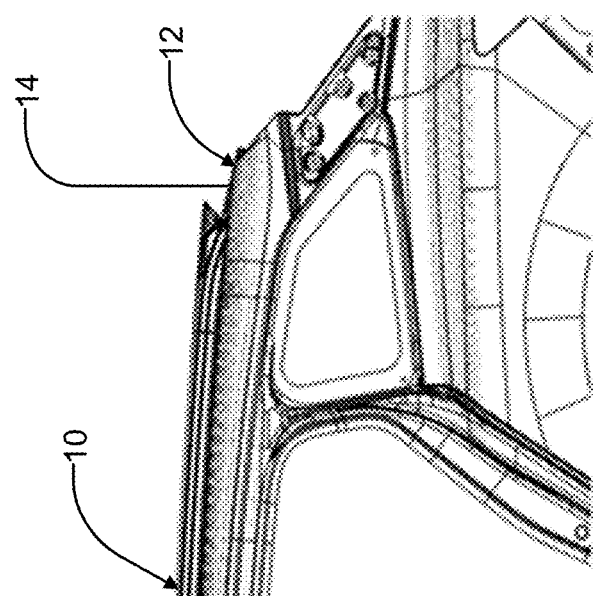
FIG. 1A is an enlarged perspective view of a housing assembly that is integrated into the roof rail of FIG. 1, and where the housing assembly includes an electronic component mounted therein.

The following description is merely exemplary in nature and is not intended to limit the present disclosure, application, or uses. It should be understood that throughout the drawings, corresponding reference numerals indicate like or corresponding parts and features.

Figure 1:
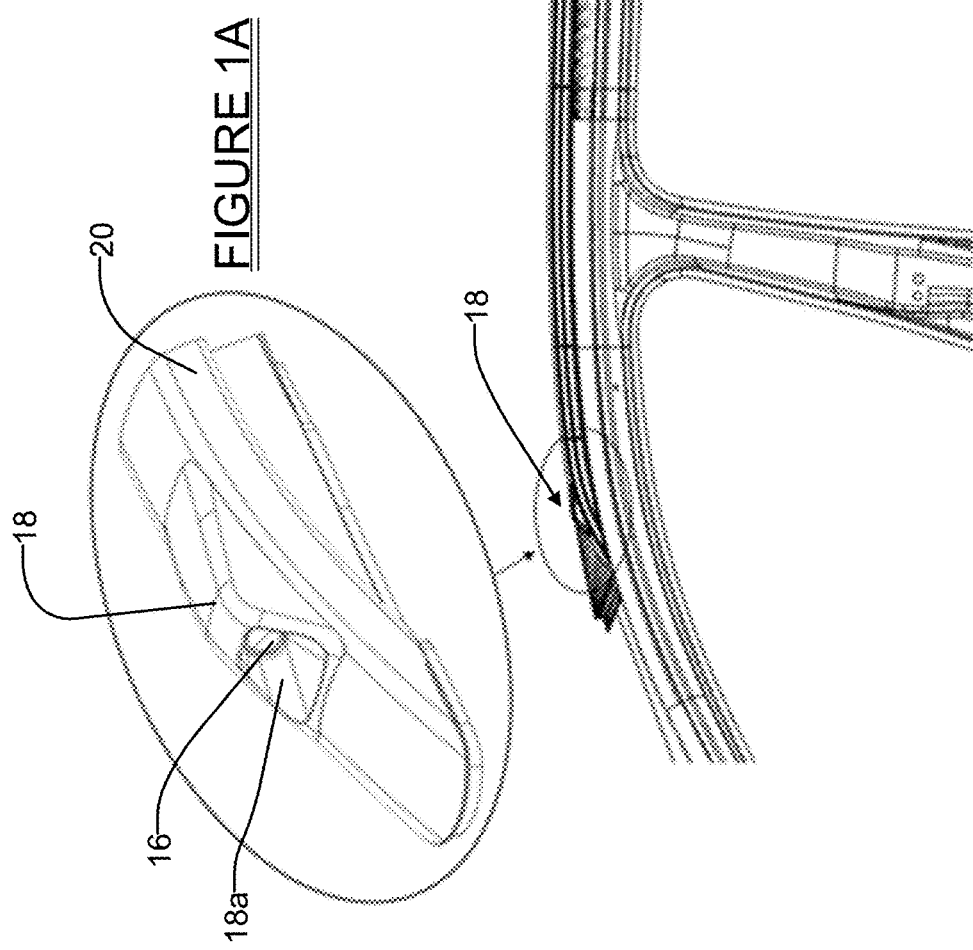
FIG. 1 is a side view of a portion of a motor vehicle incorporating one embodiment of a stretch/bent roof rail in accordance with the present disclosure.

Referring to FIG. 1, one embodiment of a roof rail apparatus 10 of a vehicle article carrier is shown in accordance with the present disclosure. The roof rail apparatus 10 (hereinafter simply "roof rail" 10) is adapted to be mounted on a roof 14 or other body surface of a vehicle 12 by suitable fasteners (not shown), for example by RIVNUT™ or stud style fasteners. The roof rail 10 in this example is what is known in the industry as a "stretch/bent" rail and is typically made by first using an extrusion process and then bending the outermost ends with a desired curvature. The roof rail 10, as shown in part in FIG. 1A, includes a component 16 housed within a housing assembly 18. In one form the component 16 forms a controllable electronic component. The housing assembly 18, once integrated into the roof rail 10, forms an aesthetically pleasing and aerodynamically efficient subsystem that securely mounts the electronic component 16 partially within a body portion 20 of the roof rail 10. In this example the housing assembly 18 is shown positioned at a leading edge of the roof rail 10, and arranges the electronic component 16 to "look" in a generally forward direction. A hollowed out portion 18a of the housing assembly 18 may be shaped or contoured to meet the needs of the specific type of device or functionality of the electronic component 16. For example, if the electronic component 16 is a camera or light with a wide angle field of view, then the hollowed out portion 18a may be shallower to avoid interfering with the camera's field of view. However, if the camera or light has a narrow field of view, then the hollowed out portion 18a may be deeper to help restrict glare or incoming light from the sides of the vehicle. Accordingly, the precise shape of the hollowed out portion 18a may be tailored to best meet the needs of the specific electronic component 16 being used in the roof rail 10.

An additional housing assembly 18 and an additional electronic component, which is the same or different from the electronic component 16, could also be located at the opposite end (i.e., trailing end of the roof rail 10 looking rearwardly) if desired. The present disclosure therefore contemplates both embodiments where either a single electronic component or multiple electronic components are included within the roof rail 10. Furthermore, it is possible that since typically two roof rail 10 will be used to form a vehicle article carrier system on the vehicle's roof (along with one or two cross bars extending perpendicularly between them, as is well known in the art), it is also possible that one roof rail 10 may include two electronic components 16, while the other roof rail 10 includes only one electronic component.

Still further, if two electronic components 16 are mounted within one roof rail 10, they may be identical components or they may be different components. The electronic component 16 may be a camera, a LiDAR component, a radar component, a light projecting component, a compact antenna, or virtually any other type of optical component, electronic component or wireless signal generating/receiving component, or any other type of component that may take advantage of the elevated location and clear line of sight provided by the roof rail 10.

Figure 2:
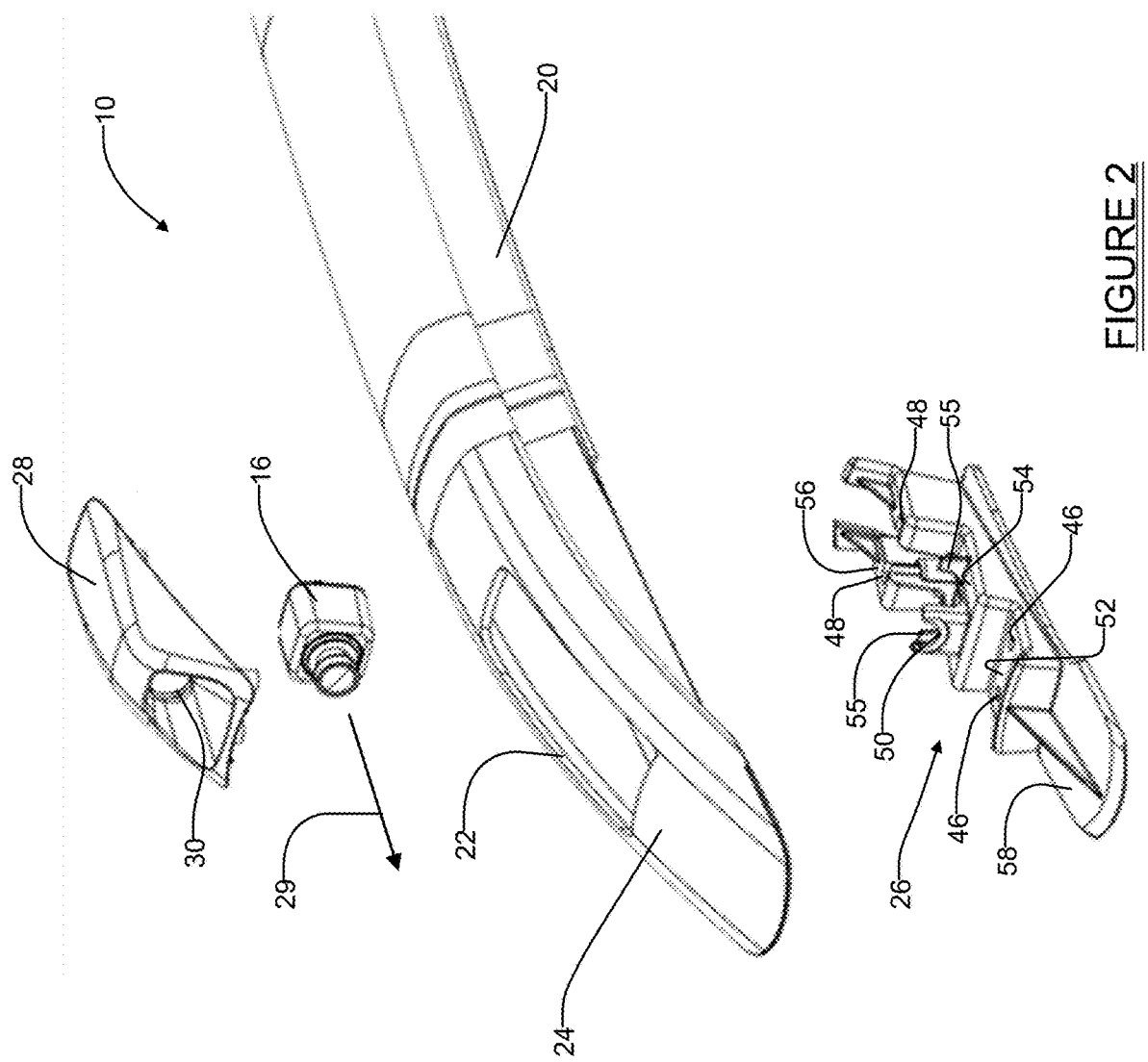
FIG. 2 is an exploded perspective view of the components of the housing assembly shown in FIG. 1A along with a leading end section of the roof rail.

Referring to FIG. 2, the roof rail 10 can be seen to include an opening or cutout 22 at a leading end section 24. The housing assembly 18 from FIG. 1 can be seen in FIG. 2 to include a support cradle 26 and a cap 28. The support cradle 26 has a footprint enabling it to be fit in a somewhat "nested" manner within the leading end section 24, and therefore does not necessitate enlarging the footprint of the leading end section 24. The cap 28 is shaped to house the electronic component 16, which in this example is a sensor that looks generally forwardly in accordance with arrow 29. The cap 28 and the support cradle 26 essentially "sandwich" the electronic component 16 to hold it securely within the roof rail leading end section 24.

Figure 3:
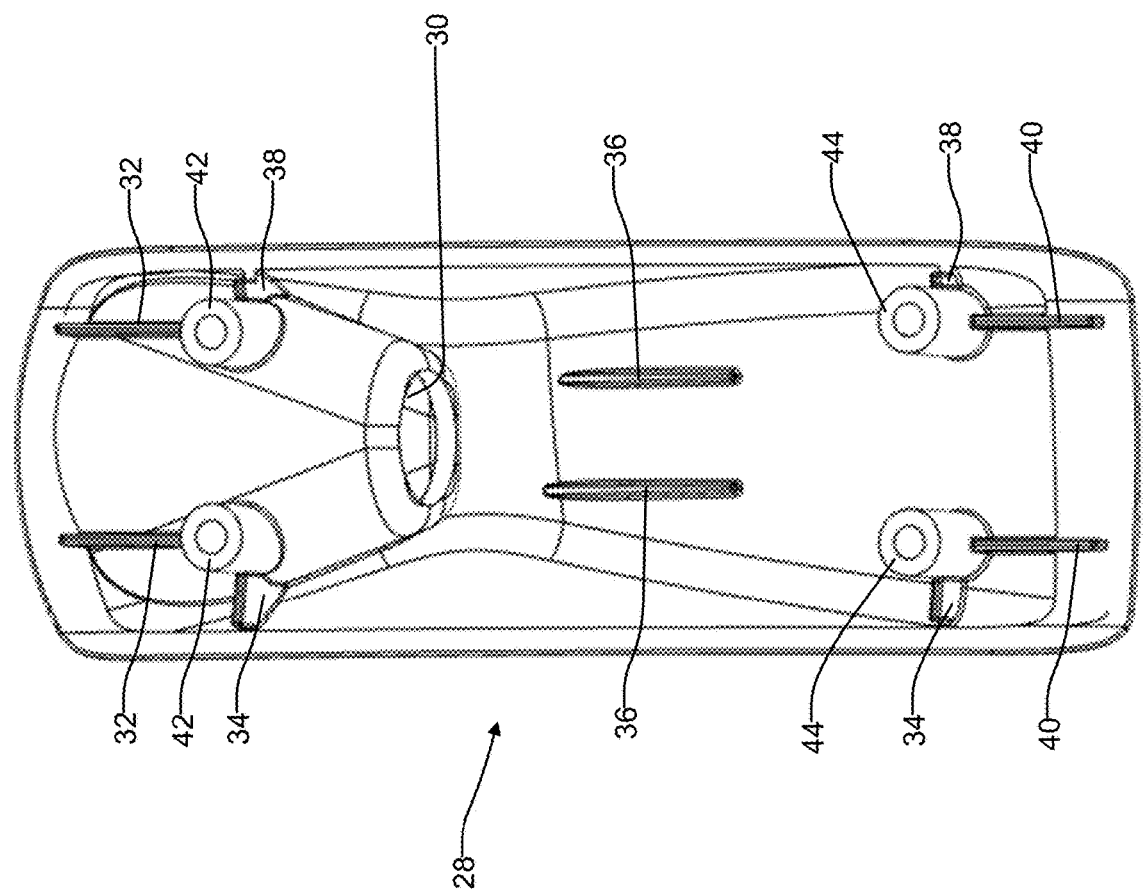
FIG. 3 is view of the undersurface of the cap shown in FIG. 2.

Referring further to FIG. 3, an inside of the cap 28 can be seen in greater detail. The cap 28 may include an opening 30 which is dimensioned as needed for the specific type of electronic component 16 being used. While not shown specifically, the opening 30 may be covered with a clear or opaque film, or may even comprise a thin layer of non-translucent material such as black plastic. Alternatively, the opening 30 may even be omitted if an unobstructed line of sight is not needed (e.g., if the electronic component 16 comprises a small antenna). Raised, blade-like element pairs 32, 34, 38 and 40 form alignment features which help to align the cap 28 in a desired position on the support cradle 26. Furthermore, element pairs 32, 34, 38, and 40 form alignment features to align the cap 28 and housing assembly 18 relative to the opening 22. The pair of Blade-like elements 36 may be used to sandwich and align the electronic component 16 in a forwardly looking orientation.

With reference to FIGS. 2 and 3, bosses 42 (FIG. 3) may be positioned over openings 46 (FIG. 2) and threaded screws (not shown) inserted from below the support cradle 26, through the openings 46 and into the bosses 42 to secure the cap 28 to the support cradle 26. The cap 28 may also include bosses 44 (FIG. 3) which align with openings 48 (FIG. 2) in the support cradle 26. An additional pair of threaded screws (not shown) may be used to secure a rear area of the cap 28 to the support cradle 26 by extending through holes 48 in the support cradle and engaging in the bosses 44 of the cap. In this manner the front and rear ends of the cap 28 are securely attached to the support cradle 26. The support cradle 26 may include a semi-circular portion 50, in addition to semi-circular portions 55, for supporting a portion of the electronic component and helping to align the electronic component with a longitudinal axis of the roof rail 10. It will be appreciated that these support portions 50 and 55 are preferably tailored to the shape of the electronic component 16.

Once assembled together, the blade-like pair of elements 32 make contact with forward planar surface 52 of the support cradle 26 (FIG. 2), the pair of blade-like elements 36 make contact with an intermediate planar surface 54 of the support cradle 26, and the pair of blade-like elements 40 make contact with a rear planar surface 56 of the support cradle 26. Blade like element pairs 34 and 38 help to center the cap 28, laterally speaking, along the longitudinal centerline of the roof rail 10 by contacting interior surfaces of the leading end section 24. A base portion 58 may rest against the roof 14 of the vehicle 12 and is completely hidden from view once assembled within the leading end section 24. Optionally, a perimeter of the cap 28 or alternatively a perimeter edge surface of the support cradle 26 may include a sealing element, for example an elastomeric or rubber-like component, for helping to provide a water tight seal. Alternatively, a sealing compound may be applied at the perimeter of one or both of the support cradle 26 and the cap 28 to help form a watertight seal.

FIG. 4 shows a side cross sectional view of the housing assembly 18 secured within the leading end section 24 of the roof rail 10, and with the electronic component 16 housed therein. FIG. 5 indicates where the section line of FIG. 4 is taken.

FIG. 6 shows the housing assembly 18 taken in accordance with the section line 6-6 in FIG. 7. Assembled roof rail 10 of FIGS. 4-5 show how the housing assembly 18 is aligned along a longitudinal axis 60 of the roof rail 10, and how the longitudinal axis "bends" inwardly slightly, which is a characteristic of the stretch bent roof rail 10.

Figure 8:
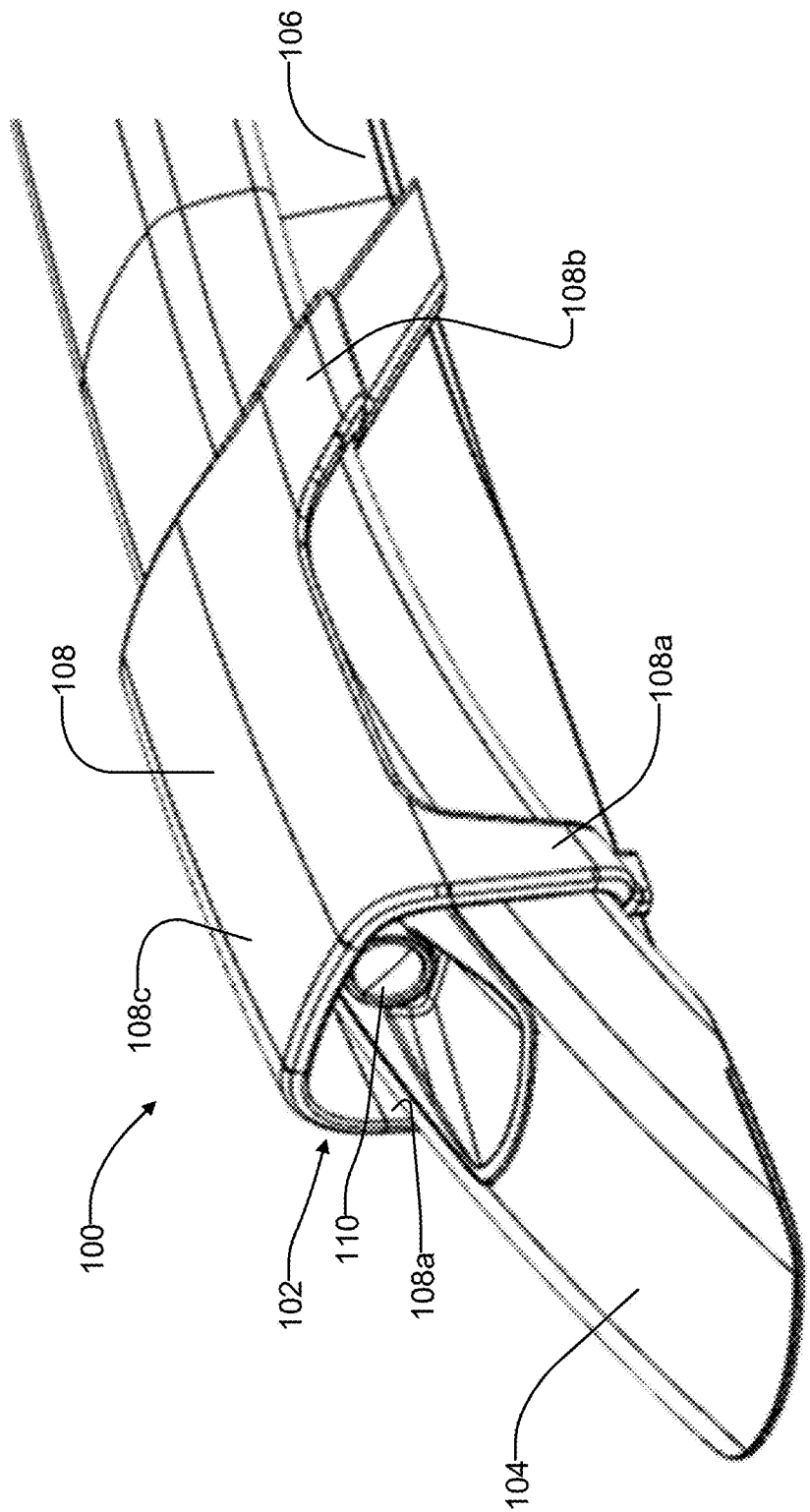
FIG. 8 is a perspective view of a portion of a roof rail in accordance with another embodiment of the present disclosure.

Referring now to FIG. 8, a roof rail 100 in accordance with another embodiment of the present disclosure is shown. The roof rail 100 is also a stretch/bent roof rail, and includes a housing assembly 102 which is disposed at a leading end portion 104 of a body portion 106 of the roof rail 100. In this example, however, the housing assembly 102 includes a cap 108 having pairs of side legs 108a and 108b, along with a more pronounced top portion 108c. The housing assembly 102 encapsulates an electronic component 110 in a manner similar to that described for the roof rail 10. The housing assembly 102 in this example forms an even more robust appearance. The housing assembly 102, and particularly the top portion 108c and side legs 108a, may be shaped or tailored to the specific electronic component 110 being used to provide maximum protection without affecting the field of view of the electronic component. The housing assembly 102 may be constructed in the same manner as described for housing assembly 18.

The various embodiments of the roof rail disclosed herein provide a highly aesthetically pleasing appearance and serve to integrate an electronic component into the roof rail without producing unsightly and aerodynamically inefficient protrusions on the roof rail. The roof rails disclosed herein, and particularly the housing assembly 18, thus provide elegant solutions to the challenge of integrating an electronic or light emitting component into a low profile, stretch/bent roof rail component, while providing excellent protection for the electronic component. Advantageously, the housing assembly 18 is integrated into the roof rail 10 with only minor modifications being required to the roof rail (e.g., the cutout section 22 in the leading end section 24 shown in FIG. 2), and without requiring that the roof rail be made taller or wider than what would ordinarily be desired for a stretch/bent roof rail, and without increasing the footprint at the leading and/or trailing edges where the housing assembly 18 is integrated into. Importantly, the integration of the housing assembly 18 into the roof rail does not affect the use of the roof rail for its primary purpose (i.e., supporting cargo thereon) and does not structurally weaken the roof rail in any tangible way. Locating the housing assembly 18 at the leading and/or trailing ends of the roof rail 10 also limits the possibility of cargo being carried on the roof rails from interfering with the field of view of the electronic components 16 and 110.

While the roof rails described herein are expected to find particular utility in connection with automotive vehicles such as cars, vans, SUVs, pickup trucks, etc., it will be appreciated that they may also be employed on virtually any other type of vehicle where it is desired to integrate an electronic component into a roof rail or elongated rail-like component, or even a grab rail-like component or trim-like component. Vehicles such as ATVs, motorcycles, snow machines, motorhomes, RVs, marine vessels, airborne vehicles and rotorcraft may potentially make use of the teachings provided herein to implement an electronic component into a rail-like element carried on the vehicle.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A stretch/bent roof rail apparatus for use on an exterior body surface of a vehicle, the apparatus comprising:
a roof rail having a body portion, the body portion having an opening;
a housing assembly adapted to fit at least partially within the opening in the body portion and including a support cradle and a cap, the support cradle and the cap configured to be secured to one another;
an electrically powered component;
the housing assembly further being configured to enable the electrically powered component to be arranged within the cap and provided with an unobstructed line of sight outwardly from the roof rail body portion; and
the support cradle having a footprint generally in accordance with the roof rail, and a base portion shaped to rest against the exterior body surface of the vehicle, and configured such that a major portion thereof fits within the roof rail, to help support the electrically powered component, and such that the roof rail, the housing assembly and the electrically powered component form a unitary assembly when assembled together.

2. The apparatus of claim 1, wherein the electrically powered component comprises a camera.

3. The apparatus of claim 1, wherein the electrically powered component comprises a light.

4. The apparatus of claim 1, wherein the cap of the housing assembly includes an opening for providing the unobstructed line of sight for the electrically powered component.

5. The apparatus of claim 1, wherein the support cradle includes a plurality of blade-like element pairs which form alignment features which help to align and support the electrically powered component within the housing assembly.

6. The apparatus of claim 5, wherein at least a subplurality of the blade-like element pairs help to align the cap relative to the support cradle.

7. The apparatus of claim 1, wherein the cap and the support cradle sandwich the electrically powered component therebetween when the housing assembly is fully assembly.

8. The apparatus of claim 1, further comprising:
the cap including a plurality of bosses for receiving threaded fastening elements;
the support cradle including a corresponding plurality of openings; and
a plurality of threaded fastening elements which extend through the plurality of openings into engagement within the support cradle to secure the support cradle to the cap.

9. The apparatus of claim 1, wherein the cap includes at least one pair of side legs and a pronounced top portion projecting above a profile of the body portion of the roof rail.

10. A stretch/bent roof rail apparatus for use on an exterior body surface of a vehicle, the apparatus comprising:
a roof rail having a body portion, the body portion having an opening;
a housing assembly adapted to fit at least partially within the opening in the body portion;
the housing assembly including a support cradle and a cap, the support cradle and the cap configured to be secured to one another;
a controllable electrical component;
the housing assembly further being configured to enable the controllable electrical component to be arranged within the cap and provided with an unobstructed line of sight outwardly from the roof rail body portion;
at least one of the cap and the support cradle including an alignment feature for aligning the cap within the opening in the body portion;
fasteners for securing the cap to the support cradle; and
the support cradle having a footprint generally in accordance with the roof rail, and a base portion shaped to rest against the exterior body surface of the vehicle, and configured such that a major portion thereof fits completely within the roof rail, to help support the controllable electrical component, and such that the roof rail, the housing assembly and the controllable electrical component form a unitary assembly when assembled together, while still enabling the roof rail to be secured to the exterior body surface.

11. The apparatus of claim 10, wherein the controllable electrical component comprises a camera.

12. The apparatus of claim 10, wherein the controllable electrical component comprises a light.

13. The apparatus of claim 10, wherein the alignment feature comprises at least one pair of outwardly projecting blade-like elements.

14. The apparatus of claim 10, further comprising an additional alignment feature for aligning the cap to the support cradle.

15. The apparatus of claim 10, wherein the support cradle includes a semi-circular portion for supporting the controllable electrical component and aligning the controllable electrical component within the housing assembly such that the controllable electrical component is aligned generally in accordance with a longitudinal axis of the roof rail.

16. The apparatus of claim 10, wherein the controllable electrical component is sandwiched between the cap and the support cradle such that at least a portion of the cap projects above a profile of the body portion of the roof rail.

17. A stretch/bent roof rail apparatus for use on an exterior body surface of a vehicle, the apparatus comprising:
a roof rail having a body portion, the body portion having an opening;
a housing assembly adapted to fit at least partially within the opening in the body portion;
the housing assembly including a support cradle and a cap, the support cradle and the cap configured to be secured to one another, and the support cradle having a base portion shaped to rest against the exterior body surface of the vehicle;
a camera;
the housing assembly further being configured to enable the camera to be arranged within the cap, the cap including an additional opening to enable an unobstructed line of sight for the camera looking outwardly along a longitudinal axis of the roof rail;

at least one of the cap and the support cradle including an alignment feature for aligning the cap within the opening in the body portion;

a support feature formed on the support cradle for supporting the camera such that the camera has a field of view extending through the opening in the cap and is aligned relative to the roof rail;

fasteners for securing the cap to the support cradle; and the support cradle having a footprint generally in accordance with the roof rail and configured such that a major portion thereof fits completely within the roof rail, to help support the camera, and such that the roof rail, the housing assembly and the camera form a unitary assembly when assembled together, while still enabling the roof rail to be secured to the exterior body surface.

18. The apparatus of claim 17, wherein the support feature comprises a semi-circular portion projecting outwardly from the support cradle.

19. The apparatus of claim 17, further comprising a plurality of pairs of blade-like supporting elements projecting from the cap, at least a first subplurality of the pairs of blade-like supporting elements operating to align the cap relative to the support cradle.

20. The apparatus of claim 17, wherein the alignment feature is formed to project from the cap, and the alignment feature comprises a plurality of pairs of blade-like elements projecting from the cap which center the cap in the opening in the body portion of the roof rail.

21. A stretch/bent roof rail apparatus for use on an exterior body surface of a vehicle, the apparatus comprising:

a roof rail having a body portion, the body portion having an opening;

a housing assembly adapted to fit at least partially within the opening in the body portion and including a support cradle and a cap, the support cradle and the cap configured to be secured to one another;

the cap including a plurality of bosses for receiving threaded fastening elements;

the support cradle including a corresponding plurality of openings;

an electrically powered component;

the housing assembly further being configured to enable the electrically powered component to be arranged within the cap and provided with an unobstructed line of sight outwardly from the roof rail body portion;

the support cradle having a footprint generally in accordance with the roof rail and configured such that a major portion thereof fits within the roof rail, to help support the electrically powered component, and such that the roof rail, the housing assembly and the electrically powered component form a unitary assembly when assembled together; and a plurality of threaded fastening elements which extend through the plurality of openings into engagement within the support cradle to secure the support cradle to the cap.

\* \* \* \* \*